(12) United States Patent
Takayama et al.

(10) Patent No.: US 7,358,843 B2
(45) Date of Patent: *Apr. 15, 2008

(54) NOISE REJECTION DEVICE AND CELLULAR PHONE INCLUDING THE NOISE REJECTION DEVICE

(75) Inventors: Manabu Takayama, Gunma (JP); Shoichi Tosaka, Gunma (JP); Ikuo Kakiuchi, Wakayama (JP); Takashige Shiga, Wakayama (JP); Masaru Maeda, Wakayama (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 257 days.

This patent is subject to a terminal disclaimer.

(21) Appl. No.: 11/240,015

(22) Filed: Sep. 29, 2005

(65) Prior Publication Data

US 2006/0125569 A1    Jun. 15, 2006

(30) Foreign Application Priority Data

Sep. 30, 2004    (JP)    ............................. 2004-287104

(51) Int. Cl.
*H01F 5/00*    (2006.01)
(52) U.S. Cl. ..................................... 336/200
(58) Field of Classification Search .................. 336/65, 336/83, 84 R, 84 C, 192, 200, 232
See application file for complete search history.

(56) References Cited

U.S. PATENT DOCUMENTS 6,525,635 B2 *    2/2003    Murata et al. ................. 336/83
6,535,095 B2 *    3/2003    Aoki et al. ..................... 336/83
6,727,792 B2 *    4/2004    Amada et al. ............... 336/192
6,856,229 B2 *    2/2005    Ogawa et al. .............. 336/200
7,170,379 B2 *    1/2007    Takayama et al. ............ 336/83

FOREIGN PATENT DOCUMENTS

JP    2000-156622    6/2000

* cited by examiner

*Primary Examiner*—Tuyen T. Nguyen
(74) *Attorney, Agent, or Firm*—Knobbe Martens Olson & Bear LLP

(57) ABSTRACT

A device includes: a pillar-shaped core consisting of a first magnetic insulating material that has two quadric prism segments at both ends thereof symmetrically and has a cylindrical segment, which has an external shape smaller than that of the quadric prism segments, coaxially between the two quadric prism segments; a resistance film that is formed in a substantially uniform thickness so as to cover an outer circumferential face of the pillar-shaped core; a spiral line segment having a predetermined number of circumferences that is formed in a portion present on the cylindrical segment of the resistance film by subjecting a spiral sulcus to laser trimming; an oxide film that is formed to cover at least a surface of a shoulder portion extending from a side to an upper surface of lines constituting the spiral line segment; an armor consisting of a second magnetic insulating material that is formed to cover a surface of the portion present on the cylindrical segment of the resistance film and such that an external shape the armor is a quadric prism shape; and a pair of external electrodes that are formed in a substantially equal thickness so as to cover surfaces of portions present on an end face and four sides of the respective quadric prism segments of the resistance film.

11 Claims, 6 Drawing Sheets

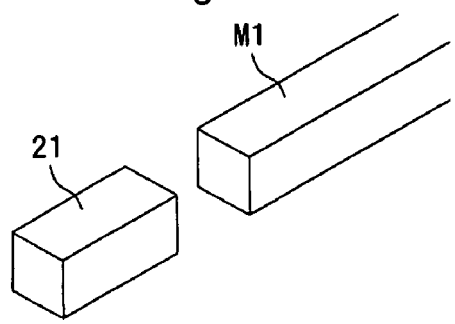
Fig. 4A
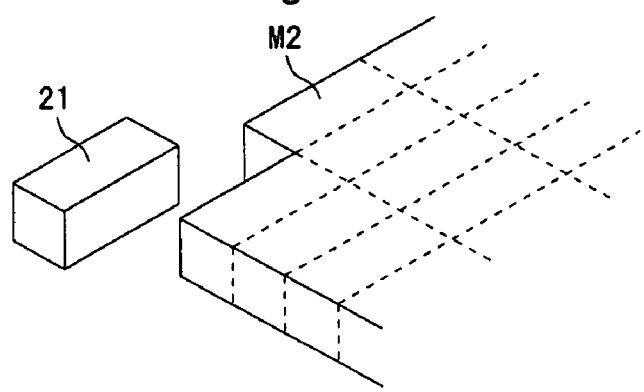
Fig. 4B
Fig. 5
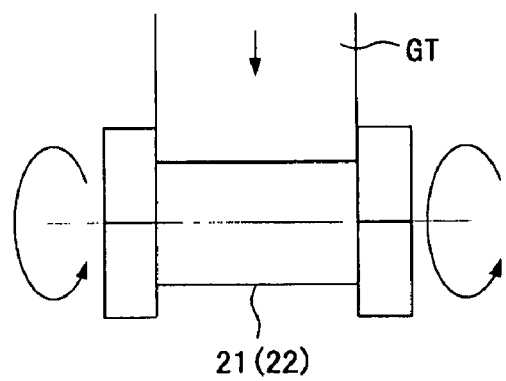
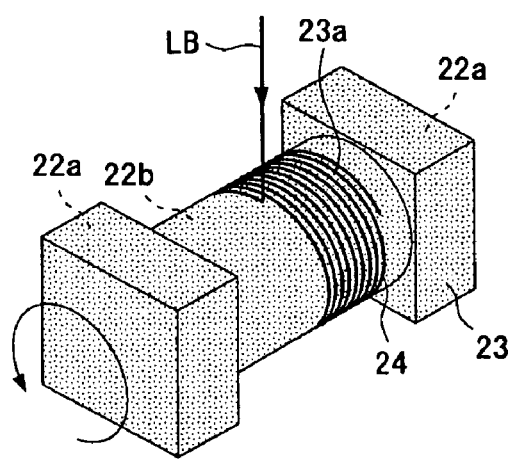
Fig. 6A
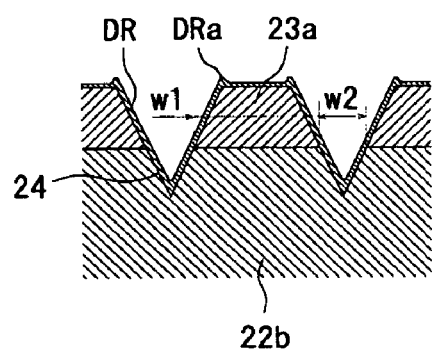
Fig. 6B

NOISE REJECTION DEVICE AND CELLULAR PHONE INCLUDING THE NOISE REJECTION DEVICE

BACKGROUND OF THE INVENTION

1. Field of the Invention

The present invention relates to a noise rejection device for removing high frequency noise from a signal line or the like and a cellular phone including the noise rejection device.

2. Description of the Related Art

An increase in signal processing speed has been advanced in digital equipment such as a cellular phone and a personal computer in accordance with enhancement of functions of the digital equipment. There are many types of digital equipment that use a CPU having a clock frequency exceeding 1 GHz. In a digital circuit having a clock frequency exceeding several hundred MHz, high frequency noise is generated not only in a band of a harmonic thereof but also in a GHz band where a higher harmonic appears. Thus, it is necessary to remove high frequency noise in a broad band of several hundred MHz to several GHz. It is also demanded to control dumping of waveforms by maintaining impedance on a low frequency side. Usually, multiple components such as beads and resistors are used to cope with this problem. Thus, a reduction of the number of components is demanded.

A bead type inductor element, in which a coil conductor is arranged in a magnetic core, is generally used as a device for removing high frequency noise. The device of this type has an impedance peak only in a specific frequency band far higher than those in other frequency bands. Thus, plural devices having impedance peaks different from one another have to be used concurrently in order to remove high frequency noise in the broad band of several hundred MHz to several GHz. As a result, cost for designing circuits increases (see, for example, JP-A-2000-156622).

SUMMARY OF THE CERTAIN EMBODIMENTS

A noise rejection device demanded by circuit designers under the present situation described above has a characteristic that impedance sufficient for expecting a noise rejection effect in a wide frequency band is generated even if a peak impedance falls. It is possible to obtain an intended noise rejection effect stably in a wide frequency band with one device and reduce cost for designing circuits when a device having such an impedance characteristic is used. It is also possible to control dumping of waveforms by maintaining impedance on a low frequency side and contribute to a reduction of the number of components.

Certain embodiments have been devised in view of the circumstances and it is an object of the embodiments to provide a noise rejection device, which can obtain a noise rejection effect stably in a wide frequency band with one device and give an effect of removing static electricity, and a cellular phone including the noise rejection device.

In order to attain the object, a noise rejection device includes: a pillar-shaped core comprising a first magnetic insulating material having a resonant frequency of permeability equal to or higher than 100 MHz; a resistance film formed on an outer circumferential face of the pillar-shaped core from one end to the other end in an axial direction of the outer circumferential face; a spiral line segment having a predetermined number of circumferences that is formed in a central part in an axial direction of the resistance film by subjecting a spiral sulcus to laser trimming; an oxide film that is formed to cover at least a surface of a shoulder portion extending from a side to an upper surface of lines constituting the spiral line segment; an armor that comprises a second magnetic insulating material having a dielectric constant smaller than that of the first magnetic insulating material and is filled in the spiral sulcus in the central part in the axial direction of the resistance film and formed to cover a surface of the lines constituting the spiral line segment; and a pair of external electrodes that are formed in portions at both ends in the axial direction of the resistance film so as to sandwich the armor.

The object, other objects, constitutional characteristics, and operational effects of the invention will be obvious through the following explanations and the accompanying drawings.

BRIEF DESCRIPTION OF THE DRAWINGS

In the accompanying drawings:

FIGS. 4A and 4B are diagrams for explaining the method of manufacturing the noise rejection device shown in FIG. 1;

FIG. 5 is a diagram for explaining the method of manufacturing the noise rejection device shown in FIG. 1;

FIGS. 6a and 6B are diagrams for explaining the method of manufacturing the noise rejection device shown in FIG. 1;

DESCRIPTION OF THE EMBODIMENTS

Figure 1:
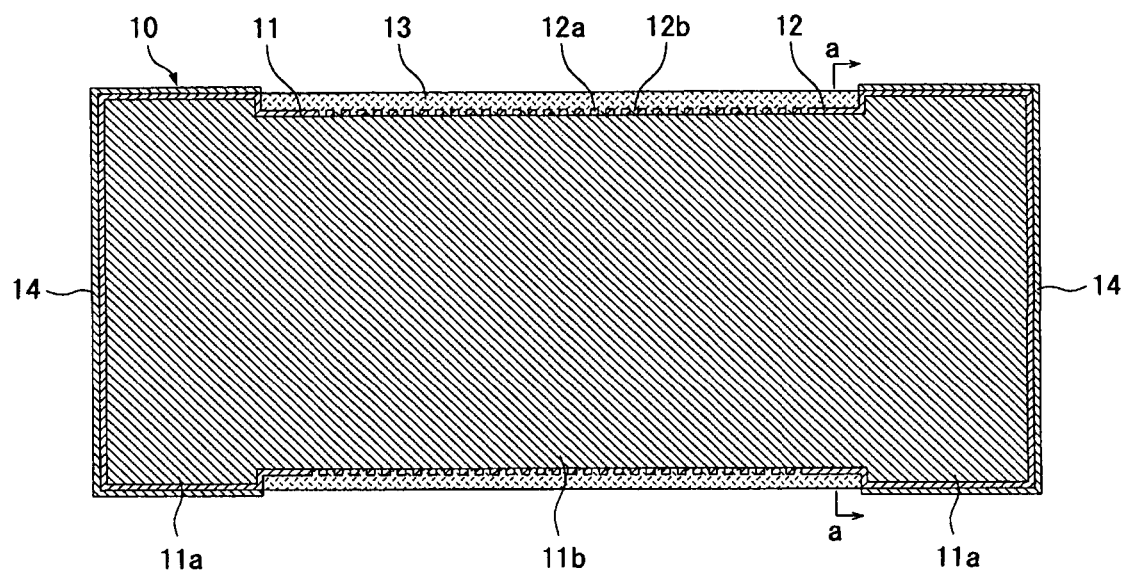
FIG. 1 is a longitudinal sectional view along a length direction of a noise rejection device in a first embodiment.
Figure 2:
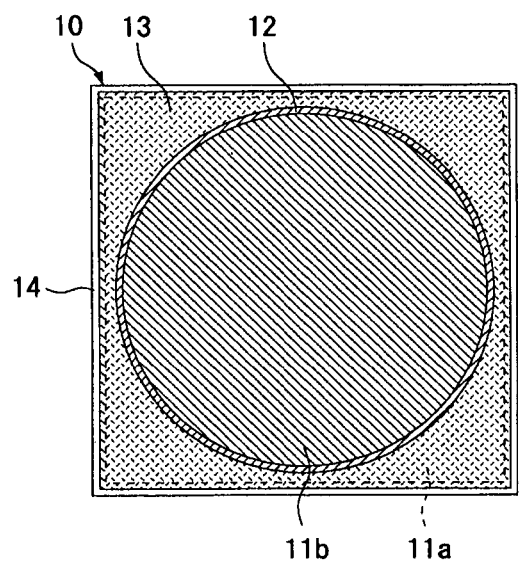
FIG. 2 is a sectional view along line a-a in FIG. 1.
Figure 7A:
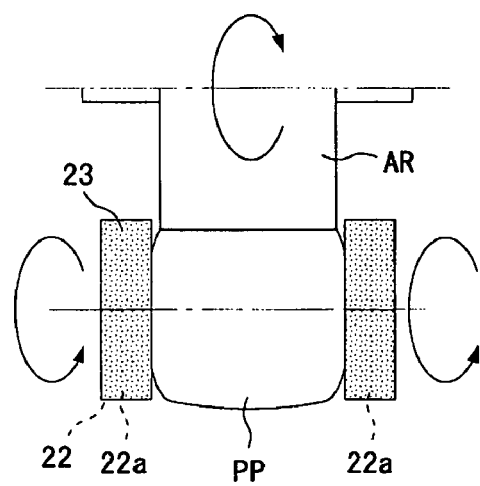
FIGS. 7A and 7B are diagrams for explaining the method of manufacturing the noise rejection device shown in FIG. 1.
Figure 7B:
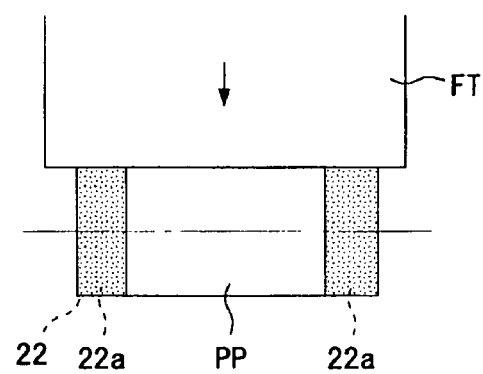
Figure 8:
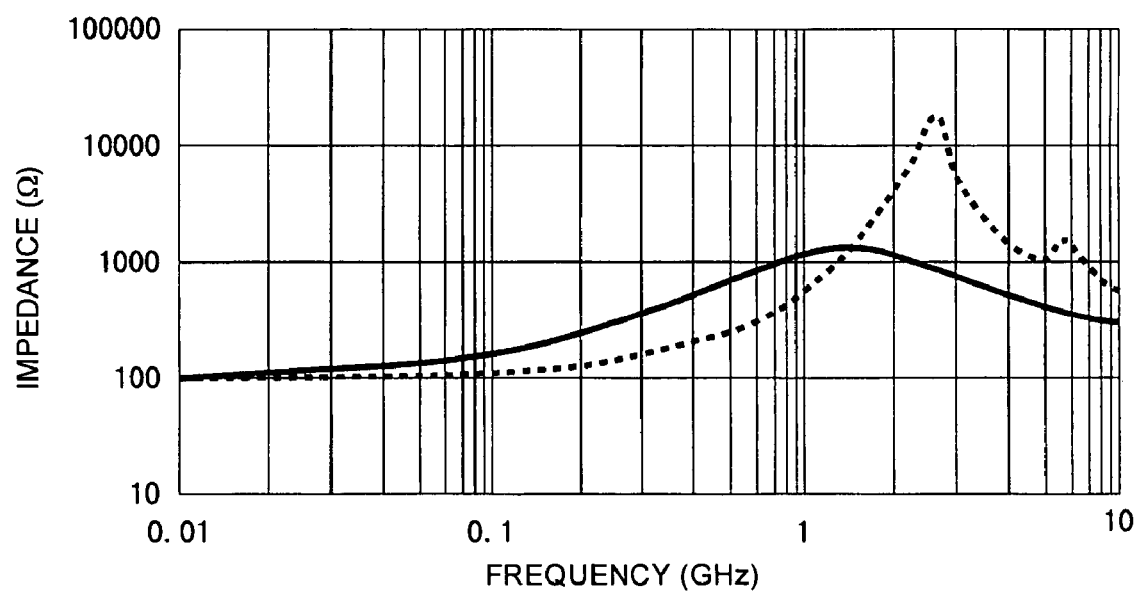
FIG. 8 is an impedance characteristic chart of the noise rejection device shown in FIG. 1.

FIGS. 1 to 8 show a first embodiment. FIG. 1 is a longitudinal sectional view along a length direction of a noise rejection device. FIG. 2 is a sectional view along line a-a in FIG. 1. FIGS. 3A to 7B are diagrams for explaining a method of manufacturing the noise rejection device shown in FIG. 1. FIG. 8 is an impedance characteristic chart of the noise rejection device shown in FIG. 1.

First, a structure of the noise rejection device will be explained with reference to FIGS. 1 and 2. In the figures, reference numeral 10 denotes a device; 11, a core (pillar-shaped core); 12, a resistance film; 13, an armor; and 14, a pair of external electrodes.

The core 11 comprises a magnetic insulating material having a resonant frequency of permeability equal to or higher than 100 MHz. The resonant frequency in this context indicates a frequency at which an imaginary component $j\mu''$ of permeability peaks in an expression of $\mu=\mu'+j\mu''$ ($\mu$ is permeability, $\mu'$ is a real component of permeability, and $\mu''$ is an imaginary component of permeability that cannot follow a magnetic field and delays by 90 degrees).

A shape of the core is not specifically limited and publicly-known shapes such as a pillar shape and a drum shape can be used. However, it is recommended that the core is a pillar-shaped core because it can be disposed easily.

As the magnetic insulating material having a resonant frequency of permeability equal to or hither than 100 MHz, it is possible to suitably use Ni—Zn spinel ferrite or hexagonal ferrite or the like of a Y type, a Z type, or the like having a resonant frequency higher than that of spinel ferrite. Ni—Zn—Cu spinel ferrite may be used for adjustment of a sintering property. It is also possible to adjust the sintering property by adding $Bi_2O_3$, $SiO_2$, or the like. Moreover, an oxide such as CoO, $Mn_2O_3$, MgO, or $Cr_2O_3$ may be added in order to perform fine adjustment of characteristics.

It is possible to adjust permeability and a frequency characteristic of Ni—Zn spinel ferrite according to composition adjustment for an Fe ratio, an Ni/Zn ratio, or the like. An advantageous Fe ratio in using Ni—Zn spinel ferrite is equal to or higher than 40 mol % as $Fe_2O_3$. When the Fe ratio exceeds 49.5 mol %, a loss tends to increase. When the Fe ratio is less than 46 mol %, permeability tends to fall. Thus, it is desirable to use Ni—Zn spinel ferrite with the Fe ratio in a range of 46 to 49.5 mol %. It is possible to change a resonant frequency according to an Ni/Zn ratio. It is possible to increase the resonant frequency by increasing the Ni/Zn ratio. Although an advantageous Ni/Zn ratio is equal to or higher than 1, it is desirable to use Ni—Zn spinel ferrite with the Ni/Zn ratio equal to or higher than 4.

Note that it is also possible to use a compound magnetic substance, which contains a predetermined amount of ferrite magnetic powder or other magnetic powder in a nonmagnetic inorganic insulator or a nonmagnetic organic insulator, as the magnetic insulating material constituting the pillar-shaped core 11. Incidentally, a sufficient impedance characteristic is not obtained in a high frequency band when a magnetic insulating material having a resonant frequency of permeability less than 100 MHz.

The pillar-shaped core 11 has two quadric prism segments 11a at both ends thereof symmetrically and has a cylindrical segment 11b, which has an external shape smaller than that of the quadric prism segments 11a, coaxially between the two quadric prism segments 11a. A transverse section of the two quadric prism segments 11a assumes a square shape or a shape similar to the square shape and a transverse section of the cylindrical segment 11b assumes a circular shape or a shape similar to the circular shape. In the figure, a boundary surface of the two quadric prism segments 11a and the cylindrical segment 11b is constituted by a surface orthogonal to a center line of the pillar-shaped core 11. However, the boundary surface may be constituted by a surface forming an acute angle with the center line of the pillar-shaped core 11 or may be formed in a circular truncated cone shape, an external shape thereof decreases gradually from the quadric prism segments 11a to the cylindrical segment 11b, three-dimensionally.

The resistance film 12 is formed in a uniform thickness, specifically, thickness of 10 to 20 μm so as to cover an outer circumferential face of the pillar-shaped core 11 from one end to the other end in an axial direction thereof. A spiral sulcus 12b with a predetermined sulcus width is formed by laser trimming in a portion present on the cylindrical segment 11b of this resistance film 12 (a central part in an axial direction of the resistance film 12). A spiral line segment 12a with a predetermined line width having a predetermined number of circumferences is formed by the spiral sulcus 12b. The number of circumferences can be adjusted appropriately according to an application.

The resistance film 12 comprises metal of an NiCu system, an NiCuP system, an NiP system, or an NiCr system. It is recommended that a resistivity of the resistance film 12 is in a range of 7 to $1000 \times 10^{-8}$ Ωm. As described in detail later, an oxide film DR (see FIG. 6B) comprising molten scatters at the time of laser trimming is formed on a surface of lines constituting the spiral line segment 12a. It is advantageous that the oxide film DR contains a magnetic insulating material element constituting the pillar-shaped core 11.

The armor 13 is filled in the spiral sulcus 12b provided in a portion present on the cylindrical segment 11b of the resistance film 12 and is formed so as to cover the surface of the lines constituting the spiral line segment 12a and such that an external shape thereof is a quadric prism shape. Four sides of the armor 13 assume a form parallel to four sides of the quadric prism segments 11a or assume a form similar to this form.

This armor 13 comprises a magnetic insulating material having a dielectric constant smaller than that of the magnetic insulating material constituting the pillar-shaped core 11. Specifically, it is possible to suitably use a magnetic insulating material comprising magnetic powder containing plastics containing 30 to 90 wt %, advantageously 65 wt % of at least one kind of Ni—Zn spinel ferrite powder, Mn—Zn spinel ferrite powder, hexagonal ferrite powder, and metallic magnetism powder in an insulating plastic material such as epoxy resin. It is possible to suitably use permalloy, sendust, pure iron, or the like for the metallic magnetism powder. In this case, it is advantageous to use metallic magnetism powder having a maximum particle diameter equal to or smaller than 20 μm in order to obtain smoothness of a surface of the armor. Also, it is possible to use metallic magnetism powder having an oxide film formed on a surface thereof.

The pair of external electrodes 14 are formed in substantially uniform thickness, specifically, thickness of 5 to 20 μm so as to cover surfaces of portions present on an end face and four sides of the respective quadric prism segments 11a of the resistance film 12 (portions at both ends in an axial direction of the resistance film 12) and sandwich the armor 13. In order to prevent intrusion of humidity into a central part in the axial direction of the resistance film 12 covered with the armor 13 (including the spiral line segment 12a), edges on the armor side of the respective external electrodes 14 are in contact with edges of the armor 13. A surface height of the sides of the respective external electrodes 14 is set slightly larger than a surface height of the sides of the armor 13 taking into account mounting of the device 10 on a substrate or the like. The external electrodes 14 comprise metal such as Ag, Cu, Ni, or Sn and an alloy of these types of metal and have a single layer or multi-layer structure.

Next, a method of manufacturing the noise rejection device shown in FIG. 1 will be explained with referenced to FIGS. 3A to 7B.

Figure 3A:
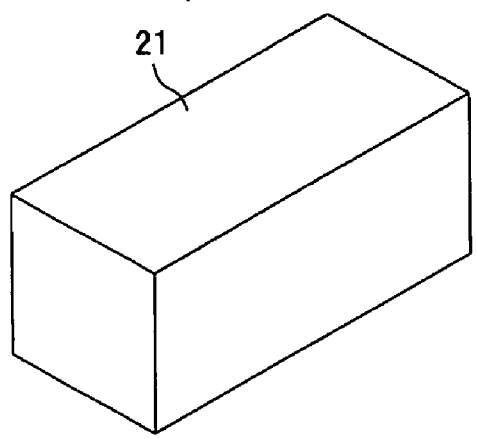
FIGS. 3A to 3F are diagrams for explaining a method of manufacturing the noise rejection device shown in FIG. 1.

First, an unfired core substrate 21 of a rectangular parallelepiped shape shown in FIG. 3A is prepared. Specifically, as shown in FIG. 4A, the unfired core substrate 21 is formed by a method of cutting an unfired ceramic bar M1 having a square shape in a transverse section, which is obtained by a method such as extrusion, in a length dimension matching a component dimension. Alternatively, as shown in FIG. 4B, the unfired core substrate 21 is formed by a method of cutting an unfired ceramic sheet M2 with a predetermined thickness, which is obtained by a method such as screen printing, in width and length dimensions matching a component dimension. The unfired ceramic sheet M2 may be a single-layer sheet or a laminated sheet. In the case of the laminated sheet, it is advantageous to use a sheet obtained by stacking plural sheets and, then, pressing the sheets in a thickness direction. Although not shown in the figures, it is also possible to obtain the unfired core substrate 21 with a method of filling ceramic slurry in a mold having a cavity matching a shape of the unfired core substrate 21.

Figure 3B:
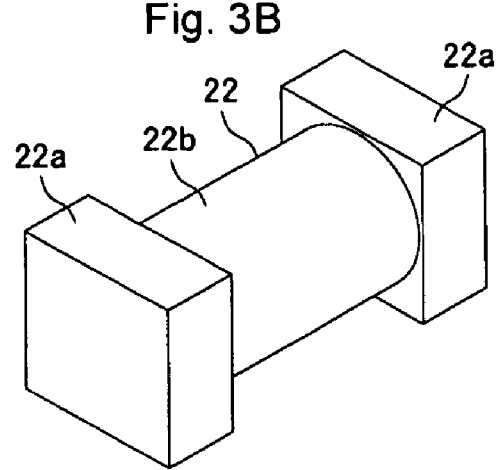

Then, as shown in FIG. 3B, the unfired core substrate 21 is cut to form an unfired pillar-shaped core 22 that has two quadric prism segments 22a at both ends thereof symmetrically and has a cylindrical segment 22b, which has an external shape smaller than that of the quadric prism segments 22a, between the two quadric prism segments 22a coaxially. Specifically, as shown in FIG. 5, the unfired pillar-shaped core 22 is formed by a method of cutting a central part of the unfired core substrate 21 with a cutting edge GT while rotating the unfired core substrate 21 in a predetermined direction with both ends in a length direction thereof held by a rotatable holder (not shown). Although not shown in the figures, it is also possible to obtain the unfired pillar-shaped core 22 with a method of filling ceramic slurry in a mold having a cavity matching a shape of the unfired pillar-shaped core 22.

The unfired pillar-shaped core 22 is baked under a heat treatment condition corresponding to a material component thereof. Barreling is collectively applied to a pillar-shaped core 22 after baking (for convenience of explanation, the same reference numeral as the unfired pillar-shaped core is used). Although the barreling after baking is not always necessary, burrs present in an edge position of the pillar-shaped core 22 are removed by the barreling and an entire surface of the pillar-shaped core 22 is roughened moderately such that a resistance film 23 described later sticks to the surface firmly.

Figure 3C:
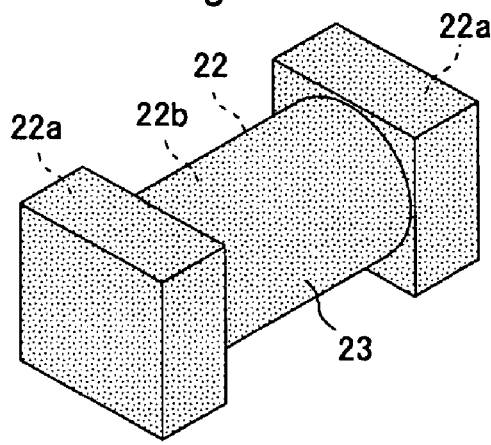

As shown in FIG. 3C, the resistance film 23 is formed with a substantially uniform thickness so as to cover an outer circumferential face of the pillar-shaped core 22 from one end to the other end in an axial direction thereof. It is possible to use a thin film forming method such as a plating method, sputtering, or vapor deposition appropriately for the formation of the resistance film 23.

Figure 3D:
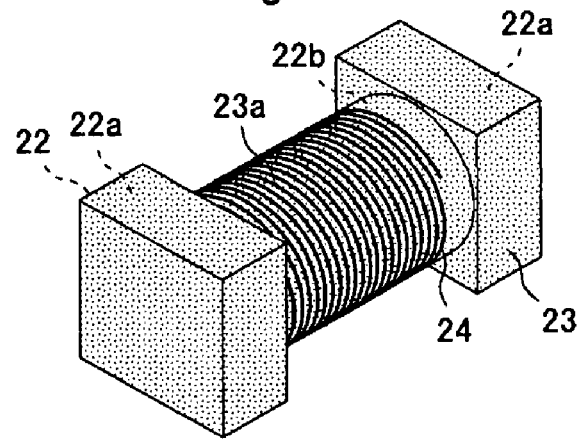

As shown in FIG. 3D, a spiral sulcus 24 with a predetermined sulcus width is formed by laser trimming in a portion present on the cylindrical segment 22b of the resistance film 23 (a central part in an axial direction of the resistance film 23). A spiral line segment 23a with a predetermined line width having a predetermined number of circumferences is formed by the spiral sulcus 24. Specifically, as shown in FIG. 6A, the spiral sulcus 24 and the spiral line segment 23a are formed by a method of rotating the pillar-shaped core 22, on which the resistance film 23 is formed, in a predetermined direction with both ends in a length direction of the pillar-shaped core 22 held by a rotatable holder (not shown), and irradiating a laser beam LB of YAG or the like on a portion present on the cylindrical segment 22b of the resistance film 23 while moving the pillar-shaped core 22 relatively to a center line direction thereof to melt and remove a laser irradiation portion. The spiral line segment 23a matching formation pitches of the spiral sulcus 24 is formed in a portion present on the cylindrical segment 22b of the resistance film 23 by this laser trimming. It is possible to arbitrarily control a line width w1 of the spiral line segment 23a and a sulcus width w2 of the spiral sulcus 24 according to a spot diameter of the irradiation laser beam and an amount of the relative movement (see FIG. 6B).

At the time of laser trimming, not only the laser irradiation portion of the resistance film 23 but also a part of the pillar-shaped core 22 under the resistance film 23 is heated and melted. An oxide film (dross) DR comprising molten scatters of that part deposits unequally but with thickness of about 0.2 to 5.0 μm so as to cover a surface of a line and a surface of a sulcus constituting the spiral line segment 23a (see FIG. 6B). The oxide film DR comprising molten scatters is mainly a magnetic insulating material element constituting the pillar-shaped core 22 and an oxide thereof. It is also possible that a metal composition constituting the resistance film 23 and an oxide thereof are contained in a small quantity.

In FIG. 6B, the oxide film DR is formed such that thick portions are present over an entire surface of the lines constituting the spiral line segment 23a and at both ends in a width direction of the spiral line segment 23a. However, a form of the oxide film DR is not limited to this. The spiral line segment 23a is protected from an external stress and an impedance raising effect described later is also obtained if the oxide film DR is formed to cover at least a surface of a shoulder portion extending from a side to an upper surface of the lines constituting the spiral line segment 23a.

In order to form the oxide film DR comprising molten scatters suitably on the surface of the lines constituting the spiral line segment 23a, it is advantageous to irradiate laser beams many times with relatively weak laser power. For example, it is possible to use a YAG laser beam with a wavelength of 1.06 μm and an oscillation frequency of 3 to 30 kHz as the laser beam LB and set an overlap ratio with respect to a laser spot diameter to 50 to 90%.

Figure 3E:
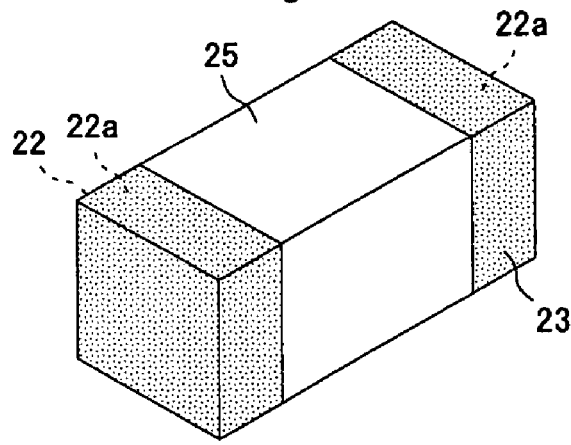

As shown in FIG. 3E, an armor 25 is formed so as to be filled in the spiral sulcus 24 provided in the portion present on the cylindrical segment 22b of the resistance film 23 and cover the surface of the lines constituting the spiral line segment 23a and such that an external shape of the armor 25 is a quadric prism shape. Specifically, as shown in FIGS. 7A and 7B, the armor 25 is formed by a method of bringing an applicator roller AR into contact with a portion present on the cylindrical segment 22b of the resistance film 23 while rotating the pillar-shaped core 22, on which the spiral line segment 23a is formed, in a predetermined direction with both ends in a length direction of the pillar-shaped core 22 held by a rotatable holder (not shown) to apply a magnetic insulating material paste PP having a dielectric constant smaller than that of the magnetic insulating material constituting the pillar-shaped core 22, and shaping an external shape of the magnetic insulating material paste PP into a quadric prism shape by pressing a shaping plate FT against the magnetic insulating material paste PP in a curing process after dry tack. When a thermosetting material is used as an insulating plastic material contained in the magnetic insulating material paste PP for an armor, the curing process is carried out by giving heat to the material. When a photosetting material to be cured by an ultraviolet ray or the like is used, the curing process is carried out by irradiation of light.

Figure 3F:
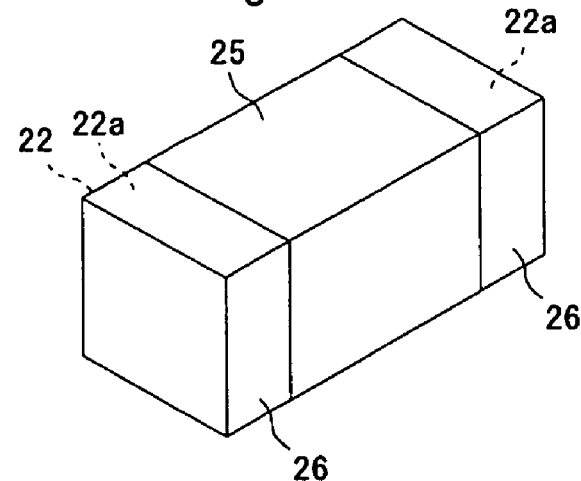

As shown in FIG. 3F, external electrodes 26 are formed with a substantially uniform thickness so as to cover surfaces of portions present on an end face and four sides of the respective quadric prism segments 22a of the resistance film 23 (portions at both ends in an axial direction of the resistance film 23) and sandwich the armor 25. It is possible to use a thin film forming method such as electrolytic plating appropriately for the formation of the external electrodes 26.

Next, an impedance characteristic of the noise rejection device shown in FIG. 1 will be explained with reference to FIG. 8. A solid line in the figure indicates an impedance characteristic in the case in which, in the structure of the device 10 shown in FIG. 1, Ni—Zn spinel ferrite (a magnetic insulating material having a resonant frequency of permeability equal to or higher than 100 MHz) with a composition ratio of 47 mol % of $Fe_2O_3$, 40 mol % of NiO, 2 mol % of ZnO, and 6 mol % of CuO is used as the pillar-shaped core 11 and epoxy resin containing 65% of Ni—Zn spinel ferrite powder is used as the armor 13. A broken line in the figure indicates an impedance characteristic for comparison in the case in which alumina is used as the pillar-shaped core 11 in the structure of the device 10 shown in FIG. 1 and epoxy resin not containing ferrite powder is used as the armor 13. In both the cases, a direct current resistance of the device 10 itself is set to 100 Ω by adjusting the number of circumferences and a line width of the spiral line segment 12a serving as a resistor.

To supplement the explanation, examples of specific numerical values of the impedance characteristic indicated by the solid line in FIG. 8 are as follows: 925 Ω at 700 MHz, 1018 Ω at 800 MHz, 1104 Ω at 900 MHz, 1177 Ω at 1 GHz, 1311 Ω at 1.5 GHz, 1169 Ω at 1.9 GHz, and 1121 Ω at 2.0 GHz.

As it is seen from the impedance characteristic indicated by the solid line in FIG. 8 and the numerical values described above, this device does not have a characteristic that impedance only in a specific frequency band far higher than those in other frequency bands is generated but has an impedance characteristic showing a gentle slope in a wide band of several hundred MHz to several GHz with a peak near 2 GHz. Thus, it is possible to obtain an intended noise rejection effect stably in a wide frequency band with one device. In particular, since impedance equal to or higher than 1000 Ω is obtained in all bands of 800 MHz, 1.5 GHz, 1.9 GHz, and 2.0 GHz that are frequency bands used by cellular phones, it is possible to obtain an excellent noise rejection effect in these bands. Therefore, it is possible to remove noise in an extremely wide frequency range. Thus, it is possible to expect a desired noise rejection effect with one component even in an application in which noise has to be removed using plural components such as beads and resistors in the past. Moreover, it is possible to cope with miniaturization of a device.

Although a ground for the appearance of the impedance characteristic described above is not clear, it is considered that the basic structure of the device 10 itself is involved in the impedance characteristic and, in addition, the presence of the oxide film DR formed in at least the shoulder portion extending from the side to the upper surface of the lines constituting the spiral line segment 12a affects the impedance characteristic significantly. This oxide film DR is mainly the magnetic insulating material element constituting the pillar-shaped core 11 and the oxide thereof. Thus, it is surmised that a surface resistance of the lines constituting the spiral line segment 12a is increased by the presence of the oxide film DR and impedance is raised by the increase in the surface resistance to cause the characteristic described above to appear.

Since a characteristic that a resistance component maintains 100 Ω is obtained in a frequency band equal to or lower than 100 MHz, the device is capable of showing a function as a static electricity removal device for removing static electricity superimposed on a signal line or the like. In a general noise rejection device, since a resistance component approaches zero as a frequency falls, a static electricity removal effect cannot be obtained at all. Therefore, it is necessary to use another device for static electricity removal concurrently in order to avoid an harmful effect due to static electricity from a human body that is regarded as a problem in, in particular, a cellular phone or the like. However, in the device 10 shown in FIG. 1, it is possible to obtain the static electricity removal effect in addition to the noise rejection effect with one device. Thus, it is possible to contribute to a reduction in the number of components, simplification of a circuit constitution, and the like significantly.

FIGS. 9A to 9F are diagrams for explaining a method of manufacturing a noise rejection device in a second embodiment.

Figure 9A:
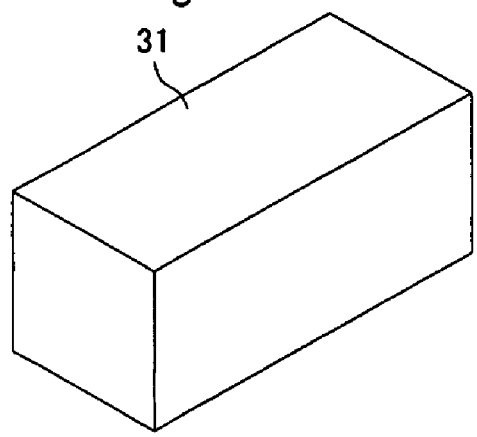
FIGS. 9A to 9F are diagrams for explaining a method of manufacturing a noise rejection device in a second embodiment.
Figure 9B:
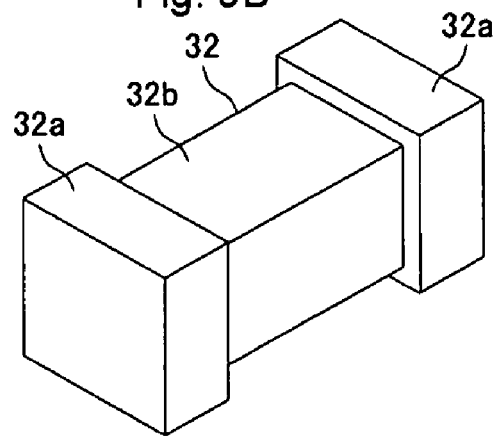
Figure 9C:
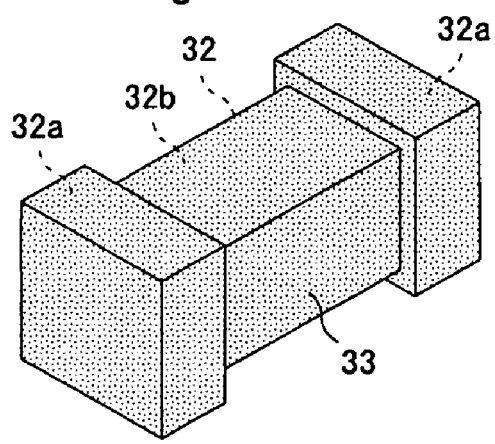
Figure 9D:
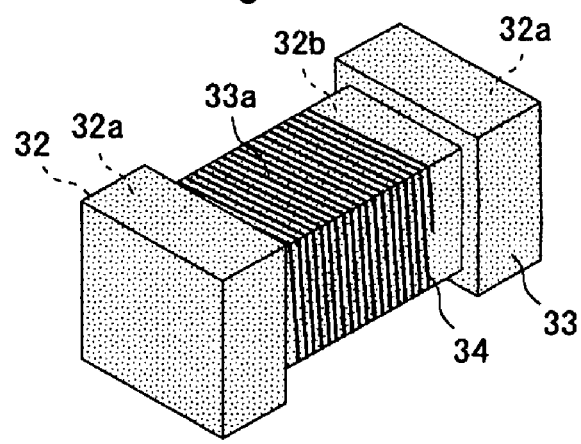
Figure 9E:
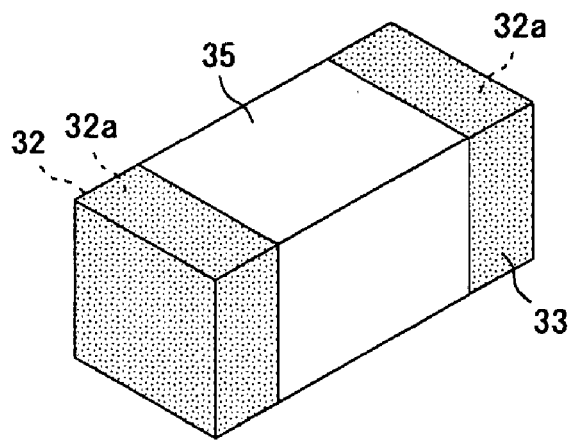
Figure 9F:
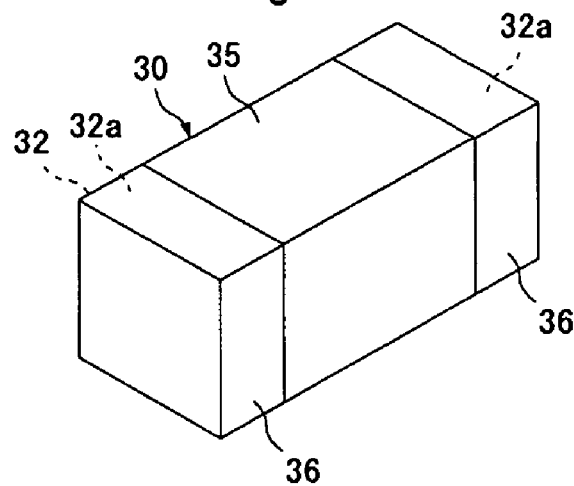

A noise rejection device 30 shown in FIG. 9F is structurally different from the noise rejection device 10 shown in FIG. 1 in that a pillar-shaped core 32 has two quadric prism segments 32a at both ends thereof symmetrically as shown in FIG. 9B and has a quadric prism segment 32b, which has an external shape smaller than that of the quadric prism segments 32a, coaxially between the two quadric prism segments 32a.

In manufacturing this noise rejection device 30, first, an unfired core substrate 31 of a rectangular parallelepiped shape shown in FIG. 9A is prepared. Specifically, in the same manner as the method shown in FIG. 4A, the unfired core substrate 31 is formed by a method of cutting an unfired ceramic bar M1 having a square shape in a transverse section, which is obtained by a method such as extrusion, in a length dimension matching a component dimension. Alternatively, in the same manner as the method shown in FIG. 4B, the unfired core substrate 31 is formed by a method of cutting an unfired ceramic sheet M2 with a predetermined thickness, which is obtained by a method such as screen printing, in width and length dimensions matching a component dimension. The unfired ceramic sheet M2 may be a single-layer sheet or a laminating sheet. In the case of the laminating sheet, it is advantageous to use a sheet obtained by stacking plural sheets and, then, pressing the sheets in a thickness direction. Although not shown in the figures, it is also possible to obtain the unfired core substrate 31 with a method of filling ceramic slurry in a mold having a cavity matching a shape of the unfired core substrate 31.

Then, as shown in FIG. 9B, the unfired core substrate 31 is cut to form an unfired pillar-shaped core 32 that has two quadric prism segments 32a at both ends thereof symmetrically and has a quadric prism segment 32b, which has an external shape smaller than that of the quadric prism segments 32a, between the two quadric prism segments 32a coaxially. Specifically, the unfired pillar-shaped core 32 is formed by carrying out, while changing a direction of the unfired core substrate 31 by 90 degrees, a method of cutting a central part of the unfired core substrate 31 with a cutting edge in parallel to sides thereof with both ends in a length direction thereof held by a rotatable holder. Although not shown in the figures, it is also possible to obtain the unfired pillar-shaped core 32 with a method of filling ceramic slurry in a mold having a cavity matching a shape of the unfired pillar-shaped core 32.

The unfired pillar-shaped core 32 is baked under a heat treatment condition corresponding to a material component thereof. Barreling is collectively applied to a pillar-shaped core 32 after baking (for convenience of explanation, the same reference numeral as the unfired pillar-shaped core is used). Although the barreling after baking is not always necessary, burrs present in an edge position of the pillar-shaped core 32 are removed by the barreling and an entire surface of the pillar-shaped core 32 is roughened moderately such that a resistance film 33 described later sticks to the surface firmly.

As shown in FIG. 9C, the resistance film 33 is formed with a substantially uniform thickness so as to cover an outer circumferential face of the pillar-shaped core 32 from one end to the other end in an axial direction thereof. It is possible to use a thin film forming method such as a plating method or sputtering appropriately for the formation of the resistance film 33.

As shown in FIG. 9D, a spiral sulcus 34 with a predetermined sulcus width is formed by laser trimming in a portion present on the quadric prism segment 32b of the resistance film 33 (a central part in an axial direction of the resistance film 33). A spiral line segment 33a with a predetermined line width having a predetermined number of circumferences is formed by the spiral sulcus 34. Specifically, in the same manner as the method shown in FIG. 6A, the spiral sulcus 34 and the spiral line segment 33a are formed by a method of rotating the pillar-shaped core 32, on which the resistance film 33 is formed, in a predetermined direction with both ends in a length direction of the pillar-shaped core 32 held by a rotatable holder (not shown), and irradiating a laser beam LB of YAG or the like on the resistance film 33 present on the quadric prism segment 32b while moving the pillar-shaped core 32 relatively to a center line direction thereof to melt and remove a laser irradiation portion. The spiral line segment 33a matching formation pitches of the spiral sulcus 34 is formed in a portion present on the quadric prism segment 32b of the resistance film 33 by this laser trimming. It is possible to arbitrarily control a line width of the spiral line segment 33a and a sulcus width of the spiral sulcus 34 according to a spot diameter of the irradiation laser beam and an amount of the relative movement.

At the time of laser trimming, not only the laser irradiation portion of the resistance film 33 but also a part of the pillar-shaped core 32 under the resistance film 33 is heated and melted. An oxide film (dross) DR comprising molten scatters of that part deposits unequally but with thickness of about 0.2 to 5.0 μm so as to cover a surface of a line and a surface of a sulcus constituting the spiral line segment 33a (see FIG. 6B). The oxide film DR comprising molten scatters is mainly a magnetic insulating material element constituting the pillar-shaped core 32 and an oxide thereof. A metal composition constituting the resistance film 33 and an oxide thereof may be contained in a small quantity. A form of this oxide film DR and an advantageous method of forming the oxide film DR are the same as those described in the first embodiment.

In the laser trimming, since the spiral sulcus 34 and the spiral line segment 33a are formed by laser irradiation in the portion present on the quadric prism segment 32b of the resistance film 33, it is likely that widths of four edges of the quadric prism segment 32b and lines present in a neighborhood part thereof become smaller than a width of lines present in four plane portions to cause disconnection. However, it is possible to reduce this likelihood by setting thickness of the oxide film DR covering surfaces of the four edges and the lines present in the neighborhood part thereof to be larger than thickness of the oxide film DR covering a surface of the lines in the four plane portions to reinforce the lines with the oxide film DR covering surfaces of the four edges and the lines present in the neighborhood part thereof. Incidentally, in order to increase the thickness of the oxide film DR covering the surfaces of the four edges and the lines present in the neighborhood part thereof, it is possible to adopt a method of setting an angle for irradiating the laser beam LB on a portion present on the quadric prism segment 32b of the resistance film 33 to be smaller than 90 degrees and setting a distance between the portion and a focal point of the laser beam LB large to thereby weaken an irradiation intensity of the laser beam LB on the portion and slowly heating the portion present on the quadric prism segment 32b of the resistance film 33 with the laser beam LB having a low irradiation intensity to thereby increase a quantity of molten scatters. It is also possible to adopt a method of changing an irradiation intensity on a laser oscillator side or an optical system side such that the laser beam LB having a low irradiation intensity is irradiated on the portion present on the quadric prism segment 32b of the resistance film 33.

As shown in FIG. 9E, an armor 35 is formed so as to be filled in the spiral sulcus 34 provided in the portion present on the quadric prism segment 32b of the resistance film 33 and cover the surface of the lines constituting the spiral line segment 33a and such that an external shape of the armor 35 is a quadric prism shape. Specifically, in the same manner as the method shown in FIGS. 7A and 7B, the armor 35 is formed by a method of bringing an applicator roller AR into contact with the portion present on the quadric prism segment 32b of the resistance film 33 while rotating the pillar-shaped core 32, on which the spiral line segment 33a is formed, in a predetermined direction with both ends in a length direction of the pillar-shaped core 32 held by a rotatable holder (not shown) to apply a magnetic insulating material paste PP having a dielectric constant smaller than that of the magnetic insulating material constituting the pillar-shaped core 32, and shaping an external shape of the magnetic insulating material paste PP into a quadric prism shape by pressing a shaping plate FT against the magnetic insulating material paste PP in a curing process after dry tack. When a thermosetting material is used as an insulating plastic material contained in the magnetic insulating material paste PP for an armor, the curing process is carried out by giving heat to the material. When a photo-setting material to be cured by an ultraviolet ray or the like is used, the curing process is carried out by irradiation of light.

External electrodes 36 are formed with a substantially uniform thickness so as to cover surfaces of portions present on an end face and four sides of the respective quadric prism segments 32a of the resistance film 33 (portions at both ends in an axial direction of the resistance film 33) and sandwich the armor 35. It is possible to use a thin film forming method such as electrolytic plating appropriately for the formation of the external electrodes 36.

In the noise rejection device 30 manufactured in this way, it is also possible to obtain the same operational effects as the noise rejection device 10 shown in FIG. 1, although there is a slight difference in the structures.

FIGS. 10A to 10F are diagrams for explaining a method of manufacturing a noise rejection device in a third embodiment.

Figure 10A:
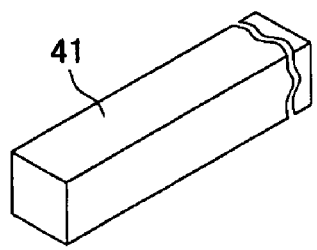
FIGS. 10A to 10F are diagrams for explaining a method of manufacturing a noise rejection device in a third embodiment.
Figure 10B:
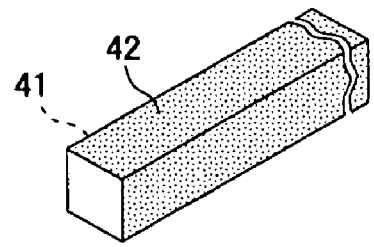
Figure 10C:
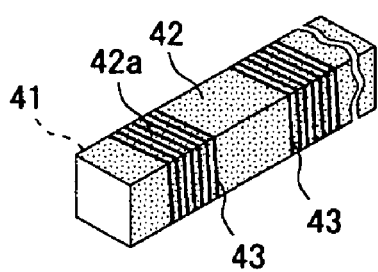
Figure 10D:
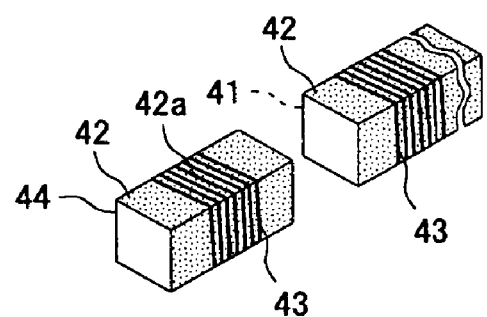
Figure 10E:
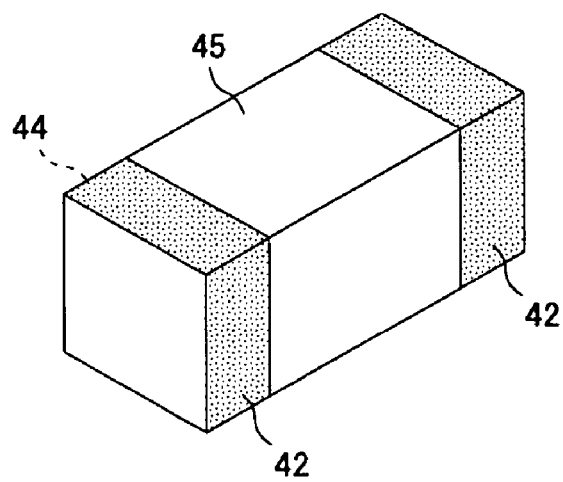
Figure 10F:
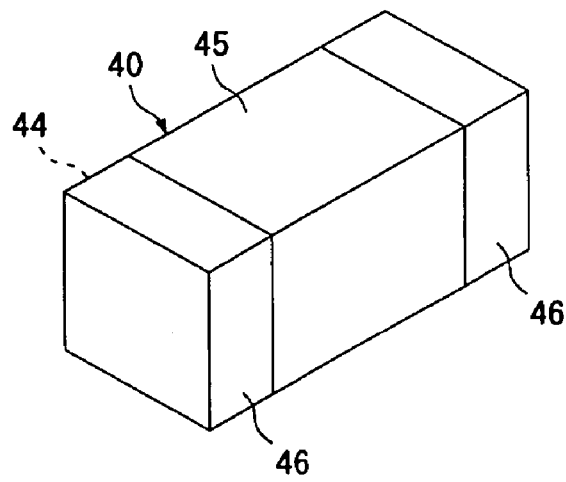

A noise rejection device 40 shown in FIG. 10F is structurally different from the noise rejection device shown in FIG. 1 in that a pillar-shaped core 44 shown in FIG. 10D has a quadric prism shape as a whole.

In manufacturing this noise rejection device 40, first, an unfired core substrate 41 of a rectangular parallelepiped shape having a predetermined length shown in FIG. 10A is prepared. Specifically, in the same manner as the method shown in FIG. 4A, the unfired core substrate 41 is formed by a method of cutting an unfired ceramic bar M1 having a square shape in a transverse section, which is obtained by a method such as extrusion, in a predetermined length dimension. Alternatively, in the same manner as the method shown in FIG. 4B, the unfired core substrate 41 is formed by a method of cutting an unfired ceramic sheet M2 with a predetermined thickness, which is obtained by a method such as screen printing, in predetermined width and length dimensions. The unfired ceramic sheet M2 may be a single-layer sheet or a laminating sheet. In the case of the laminating sheet, it is advantageous to use a sheet obtained by stacking plural sheets and, then, pressing the sheets in a thickness direction. Although not shown in the figures, it is also possible to obtain the unfired core substrate 41 with a method of filling ceramic slurry in a mold having a cavity matching a shape of the unfired core substrate 41.

The unfired pillar-shaped core substrate 41 is baked under a heat treatment condition corresponding to a material component thereof. Barreling is collectively applied to a core substrate 41 after baking (for convenience of explanation, the same reference numeral as the unfired pillar-shaped core is used). Although the barreling after baking is not always necessary, burrs present in an edge position of the core substrate 41 are removed by the barreling and an entire surface of the core substrate 41 is roughened moderately such that a resistance film 42 described later sticks to the surface firmly.

The resistance film 42 is formed with a substantially uniform thickness so as to cover an entire surface of the core substrate 41 as shown in FIG. 10B. It is possible to use a thin film forming method such as a plating method, sputtering, or vapor deposition appropriately for the formation of the resistance film 42.

As shown in FIG. 10C, a spiral sulcus 43 with a predetermined sulcus width is formed at equal intervals by laser trimming in the resistance film 43 present on a surface of the core substrate 41. A spiral line segment 42a with a predetermined line width having a predetermined number of circumferences is formed by the spiral sulcus 43. Specifically, in the same manner as the method shown in FIG. 6A, the spiral sulcus 43 and the spiral line segment 42a are formed at equal intervals by a method of rotating the core substrate 41, on which the resistance film 42 is formed, in a predetermined direction with both ends in a length direction of the core substrate 41 held by a rotatable holder (not shown), and irradiating a laser beam LB of YAG or the like on the resistance film 42 while moving the core substrate 41 relatively to a center line direction thereof to melt and remove a laser irradiation portion. The spiral line segment 42a matching formation pitches of the spiral sulcus 43 is formed in the resistance film 42 by this laser trimming. It is possible to arbitrarily control a line width of the spiral line segment 42a and a sulcus width of the spiral sulcus 43 according to a spot diameter of the irradiation laser beam and an amount of the relative movement.

At the time of laser trimming, not only the laser irradiation portion of the resistance film 42 but also a part of the core substrate 41 under the resistance film 42 is heated and melted. An oxide film (dross) DR comprising molten scatters of that part deposits unequally but with thickness of about 0.2 to 5.0 µm so as to cover a surface of a line and a surface of a sulcus constituting the spiral line segment 42a (see FIG. 6B). The oxide film DR comprising molten scatters is mainly a magnetic insulating material element constituting the core substrate 41 and an oxide thereof. It is also possible that a metal composition constituting the resistance film 42 and an oxide thereof are contained in a small quantity. A form of this oxide film DR and an advantageous possible method of forming the oxide film DR are the same as those described in the first embodiment.

At the time of laser trimming, the laser irradiation method described in the second embodiment is adopted as required to increase thickness of the oxide film DR covering surfaces of four edges in the spiral line segment 42a and lines present in neighborhood part thereof and reinforce the lines with the oxide film DR.

As shown in FIG. 10D, the core substrate 41 after forming the spiral sulcus 43 and the spiral line segment 42a is cut in a length dimension matching a component dimension to form the pillar-shaped core 44 corresponding to one component.

As shown in FIG. 10E, an armor 45 is formed so as to be filled in the spiral sulcus 43 of the pillar-shaped core 44 and cover the surface of the lines constituting the spiral line segment 42a and such that an external shape of the armor 45 is a quadric prism shape. Specifically, in the same manner as the method shown in FIGS. 7a and 7B, the armor 45 is formed by a method of bringing an applicator roller AR into contact with the spiral line segment 42a while rotating the pillar-shaped core 44 in a predetermined direction with both ends in a length direction of the pillar-shaped core 44 held by a rotatable holder (not shown) to apply a magnetic insulating material paste PP having a dielectric constant smaller than that of the magnetic insulating material constituting the pillar-shaped core 44, and shaping an external shape of the magnetic insulating material paste PP into a quadric prism shape by pressing a shaping plate FT against the magnetic insulating material paste PP in a curing process after dry tack. When a thermosetting material is used as an insulating plastic material contained in the magnetic insulating material paste PP for an armor, the curing process is carried out by giving heat to the material. When a photo-setting material to be cured by an ultraviolet ray or the like is used, the curing process is carried out by irradiation of light.

As shown in FIG. 10F, external electrodes 46 are formed with a substantially uniform thickness so as to cover surfaces of portions at both ends of the resistance film 42 and sandwich the armor 45. It is possible to use a thin film forming method such as electrolytic plating appropriately for the formation of the external electrodes 46.

In the noise rejection device 40 manufactured in this way, it is also possible to obtain the same operational effects as the noise rejection device 10 shown in FIG. 1, although there is a slight difference in the structures.

According to the invention, it is possible to obtain a noise rejection effect stably in a wide frequency band with one device and use the device also as a static electricity removal device suitably.

What is claimed is:

1. A noise rejection device comprising:
   a core comprising a first magnetic insulating material having a resonant frequency of permeability equal to or higher than 100 MHz;
   a resistance film formed on an outer peripheral face of the core from one end to the other end in an axial direction of the outer peripheral face;
   a spiral line segment and a corresponding spiral sulcus, each having a predetermined number of circumferences formed in the resistance film in an axial direction of the resistance film;
   an oxide film formed over a surface of at least a shoulder portion extending from a side to an upper surface of lines constituting the spiral line segment;
   an armor comprising a second magnetic insulating material having a dielectric constant smaller than that of the first magnetic insulating material, filling the spiral sulcus in the central part in the axial direction of the resistance film and covering a surface of the lines constituting the spiral line segment; and a pair of external electrodes formed in portions at both ends in the axial direction of the resistance film so as to sandwich the armor.

2. A noise rejection device according to claim 1, wherein a resistivity of the resistance film is in a range of 7 to $1000 \times 10^{-8}$ Ωm.

3. A noise rejection device according to claim 1, wherein the oxide film comprises molten scatters at the time of laser trimming, wherein the molten scatters contain a first magnetic insulating material element.

4. A noise rejection device according to claim 1, wherein the armor comprises magnetic powder containing plastics comprising 30 to 90 wt % of at least one of Ni—Zn spinel ferrite powder, Mn—Zn spinel ferrite powder, hexagonal ferrite powder, and metallic magnetism powder.

5. A noise rejection device according to claim 1, wherein the core is pillar-shaped.

6. A noise rejection device according to claim 1, wherein the first magnetic insulating material comprises at least one of Ni—Zn spinel ferrite, Y type hexagonal ferrite, and Z type hexagonal ferrite.

7. A noise rejection device according to claim 1, wherein the first magnetic insulating material comprises Ni—Zn spinel ferrite, and
an Fe ratio is between about 46 mol % and about 49.5 mol % as $Fe_2O_3$.

8. A noise rejection device according to claim 1, wherein the first magnetic insulating material comprises Ni—Zn spinel ferrite, and
an Ni/Zn ratio is equal to or higher than about 1.

9. A noise rejection device according to claim 1, wherein the first magnetic insulating material comprises Ni—Zn spinel ferrite, and
an Ni/Zn ratio is equal to or higher than about 4.

10. A noise rejection device according to claim 1, wherein the resistance film comprises a film formed of metal comprising at least one of NiCu, NiCuP, NiP and NiCr.

11. A cellular phone including a noise rejection device according to claim 1.

* * * * *

UNITED STATES PATENT AND TRADEMARK OFFICE
CERTIFICATE OF CORRECTION

PATENT NO. : 7,358,843 B2 Page 1 of 1
APPLICATION NO. : 11/240015
DATED : April 15, 2008
INVENTOR(S) : Takayama et al.

It is certified that error appears in the above-identified patent and that said Letters Patent is hereby corrected as shown below:

Title Page; item (73);
At Assignee on the first page of the patent, immediately before "Taiyo Yuden Co., Ltd., Tokyo (JP)," please add --Chuki Seiki Co., Ltd., Wakayama (JP)--.

Signed and Sealed this

Fourteenth Day of October, 2008

JON W. DUDAS
*Director of the United States Patent and Trademark Office*